(12) United States Patent
Joung et al.

(10) Patent No.: US 8,982,764 B2
(45) Date of Patent: Mar. 17, 2015

(54) METHOD OF DECODING PHYSICAL BROADCAST CHANNEL IN LONG TERM EVOLUTION SYSTEM

(71) Applicant: Innowireless Co., Ltd., Seongnam-si (KR)

(72) Inventors: Jinsoup Joung, Seongnam-si (KR); Seunghwan Ji, Seongnam-si (KR); Yonghoon Lim, Seoul (KR); Seungik Yang, Seoul (KR); Soocheol Kyeong, Cheongju-si (KR)

(73) Assignee: Innowireless Co., Ltd. (KR)

( * ) Notice: Subject to any disclaimer, the term of this patent is extended or adjusted under 35 U.S.C. 154(b) by 150 days.

(21) Appl. No.: 13/799,164

(22) Filed: Mar. 13, 2013

(65) Prior Publication Data

US 2013/0265927 A1    Oct. 10, 2013

(30) Foreign Application Priority Data

Apr. 10, 2012  (KR) ......................... 10-2012-0037059

(51) Int. Cl.
 *H04H 20/71*  (2008.01)
 *H04W 72/00* (2009.01)
 *H04L 1/00*   (2006.01)

(52) U.S. Cl.
 CPC ........... *H04W 72/005* (2013.01); *H04L 1/0046* (2013.01)
 USPC ....................................................... 370/312

(58) Field of Classification Search
 CPC .... H04B 7/024; H04B 7/0891; H04L 5/0091; H04L 25/03891; H04L 5/0053; H04L 1/0067; H04L 1/0061; H04L 1/0046; H04L 1/08; H04L 1/0052
 USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
 See application file for complete search history.

(56) References Cited

U.S. PATENT DOCUMENTS

| 2011/0013730 A1* | 1/2011 | Mansson et al. ............... 375/340 |
| 2011/0026645 A1* | 2/2011 | Luo et al. ....................... 375/340 |
| 2011/0228883 A1* | 9/2011 | Liu et al. ........................ 375/341 |
| 2011/0317780 A1* | 12/2011 | Kang et al. .................... 375/260 |
| 2012/0076102 A1* | 3/2012 | Ko et al. ......................... 370/329 |
| 2012/0188877 A1* | 7/2012 | Chin et al. ..................... 370/241 |
| 2013/0242951 A1* | 9/2013 | Lee et al. ....................... 370/336 |

FOREIGN PATENT DOCUMENTS

KR    1020110067656    6/2011

\* cited by examiner

*Primary Examiner* — Jung-Jen Liu
(74) *Attorney, Agent, or Firm* — Cantor Colburn LLP (57) ABSTRACT

The present invention relates, in general, to a method of decoding a Physical Broadcast Channel (PBCH) in a Long Term Evolution (LTE) system and, more particularly, to a method of detecting a Master Information Block (MIB) contained in a PBCH.

4 Claims, 7 Drawing Sheets

$X_1(1600) = X_1(25) \oplus X_1(20) \oplus X_1(19) \oplus X_1(17) \oplus X_1(12) \oplus X_1(9) \oplus X_1(6) \oplus X_1(5) \oplus X_1(4) \oplus X_1(3) \oplus X_1(1)$

| (register address) | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| (REPRESENTATION OF BINARY NUMBER) | 0 | 0 | 0 | 0 | 0 | 1 | 0 | 0 | 0 | 0 | 1 | 1 | 0 | 1 | 0 | 0 | 0 | 0 | 1 | 0 | 0 | 1 | 0 | 0 | 1 | 1 | 1 | 1 | 0 | 1 | 0 |

$X_2(1600) = X_2(23) \oplus X_2(20) \oplus X_2(19) \oplus X_2(16) \oplus X_2(12) \oplus X_2(8) \oplus X_2(3) \oplus X_2(2) \oplus X_2(1)$

| (register address) | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| (REPRESENTATION OF BINARY NUMBER) | 0 | 0 | 0 | 0 | 0 | 0 | 0 | 1 | 0 | 0 | 1 | 1 | 0 | 0 | 1 | 0 | 0 | 0 | 1 | 0 | 0 | 0 | 1 | 0 | 0 | 0 | 0 | 1 | 1 | 1 | 0 |

FIG. 6

$X_1(1600) = X_1(25) \oplus X_1(20) \oplus X_1(19) \oplus X_1(17) \oplus X_1(12) \oplus X_1(9) \oplus X_1(6) \oplus X_1(5) \oplus X_1(4) \oplus X_1(3) \oplus X_1(1)$ $X_1(1601) = X_1(26) \oplus X_1(21) \oplus X_1(20) \oplus X_1(18) \oplus X_1(13) \oplus X_1(10) \oplus X_1(7) \oplus X_1(6) \oplus X_1(5) \oplus X_1(4) \oplus X_1(2)$

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| BIT MASK OF X1 (1600) | 0 | 0 | 0 | 0 | 0 | 1 | 0 | 0 | 0 | 0 | 1 | 0 | 0 | 1 | 0 | 0 | 0 | 0 | 1 | 0 | 0 | 1 | 1 | 1 | 0 | 1 | 0 |
| BIT MASK OF X1 (1601) | 0 | 0 | 0 | 0 | 1 | 0 | 0 | 0 | 0 | 1 | 0 | 0 | 1 | 0 | 0 | 0 | 0 | 1 | 0 | 0 | 1 | 1 | 1 | 0 | 1 | 0 | 0 |

FIG. 7

$X_1(31) = X_1(0) \oplus X_1(3)$ $X_2(31) = X_2(0) \oplus X_2(1) \oplus X_2(2) \oplus X_2(3)$ CYCLIC BIT MASK OF $X_1$ | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 |

CYCLIC BIT MASK OF $X_2$ | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 |

METHOD OF DECODING PHYSICAL BROADCAST CHANNEL IN LONG TERM EVOLUTION SYSTEM

BACKGROUND OF THE INVENTION

1. Field of the Invention

The present invention relates, in general, to a method of decoding a Physical Broadcast Channel (PBCH) in a Long Term Evolution (LTE) system and, more particularly, to a scheme for detecting a Master Information Block (MIB) contained in a PBCH.

2. Description of the Related Art

A Master Information Block (MIB) in a Long Term Evolution (LTE) downlink contains the following four types of important information frequently used when a terminal that receives a downlink signal detects the signal.

Figure 1:
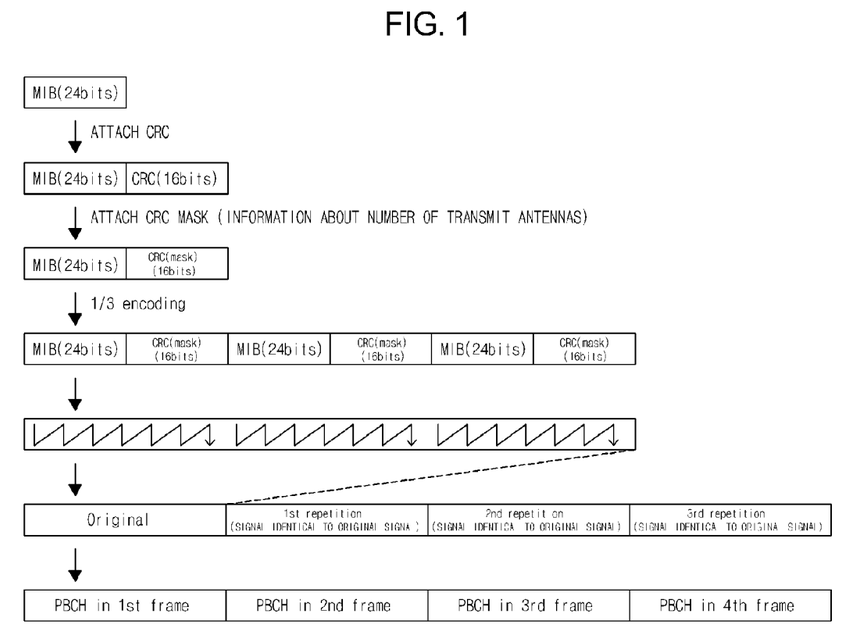
FIG. 1 is a diagram showing a process for transmitting a downlink PBCH in an LTE system.

1) Downlink bandwidth information
2) Physical Hybrid-automatic repeat request (ARQ) Indicator Channel (PHICH) duration information
3) PHICH resource information
4) System frame number FIG. 1 is a diagram showing a process for transmitting a PBCH to an LTE downlink.

MIB information is configured in the form of a Physical Broadcast Channel (PBCH) in a physical layer using the process shown in FIG. 1 and is then transmitted a total of four times every 10 ms (frame length). That is, a single signal obtained by encoding MIB is divided and transmitted for a period of 40 ms. The four PBCHs transmitted every 10 ms for a period of 40 ms include the same MIB, but are transformed into different signals via scrambling and then transmitted.

When the terminal receives a PBCH signal, the terminal must find the following two types of information so as to decode the received PBCH and obtain an MIB.

1) Frame numbers in which a base station transmits the PBCH are required in a scrambling process.
2) Information about the number of transmit antennas of the base station is required so as to eliminate a PBCH Cyclic Redundancy Check (CRC) mask.

Figure 2:
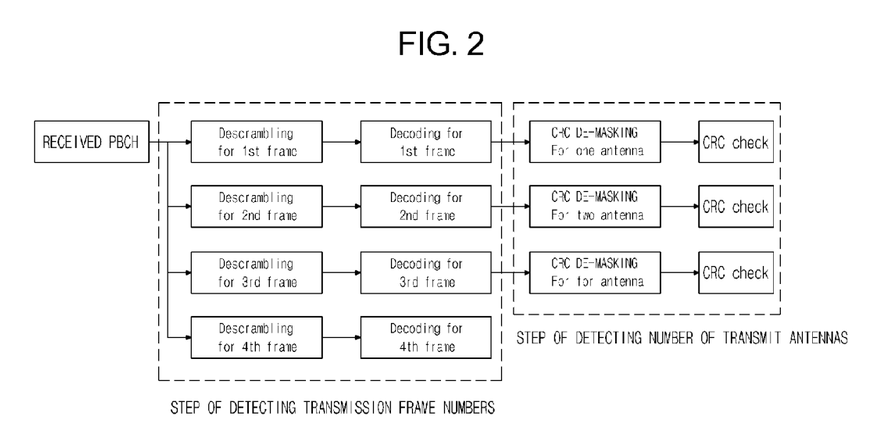
FIG. 2 is a diagram showing a blind PBCH decoding process in an LTE system.

The terminal may obtain an MIB via decoding only after detecting both the above two types of information. However, since the above two types of information are contained in the received PBCH signal itself, a blind decoding method must be applied which performs all decoding operations in consideration of all possible cases and finds cases having no error in a CRC check. First, the total number of times that blind descrambling and decoding are processed to detect transmission frame numbers is four, which corresponds to frame transmission numbers. Further, the number of blind CRC checks for finding the number of transmit antennas is three, which corresponds to the number of transmit antennas per frame. Therefore, the blind PBCH decoding process actually requires a total of 12 operation processes, as shown in FIG. 2.

SUMMARY OF THE INVENTION

Accordingly, the present invention has been made keeping in mind the above problems occurring in the prior art, and an object of the present invention is to provide a scheme for detecting an MIB contained in the PBCH of an LTE downlink via a minimum number of decoding processes.

Another object of the present invention is to propose a scheme for finding information about transmission frame numbers and the number of transmit antennas using a low computational load.

In order to accomplish the above objects, the present invention provides a method of extracting frame numbers, the method extracting frame numbers of a Physical Broadcast Channel (PBCH) transmitted by a base station so as to obtain a Master Information Block (MIB) in a Long Term Evolution (LTE) system, including calculating values obtained by shifting bit values constituting a 31-bit shift register to right 1600 times, performing an exclusive-OR operation on bit values of initially set specific bits among the values of the shift register shifted 1600 times, and descrambling results of performing the exclusive-OR operation.

Further, in order to accomplish the above objects, the present invention provides a method of extracting a number of transmit antennas, the method extracting a number of transmit antennas of a base station so as to obtain a Master Information Block (MIB) in a Long Term Evolution (LTE) system, including if a polynomial of a decoded message obtained when an error is not present via a Cyclic Redundancy Check (CRC) is M, a CRC polynomial is P, and a representation of 16-bit transmit antenna information by a polynomial is T, performing a CRC on a received signal using the polynomial P, determining whether T identical to results of performing the CRC is present, and if it is determined that the identical T is present, determining a value of T to be the number of transmit antennas.

DESCRIPTION OF THE PREFERRED EMBODIMENTS

The above and other objects, features and advantages of the present invention will be more clearly understood from the following detailed description taken in conjunction with the accompanying drawings. Hereinafter, the present invention will be described in detail so that those skilled in the art will easily understand and implement the present invention from the embodiments of the present invention.

Figure 3:
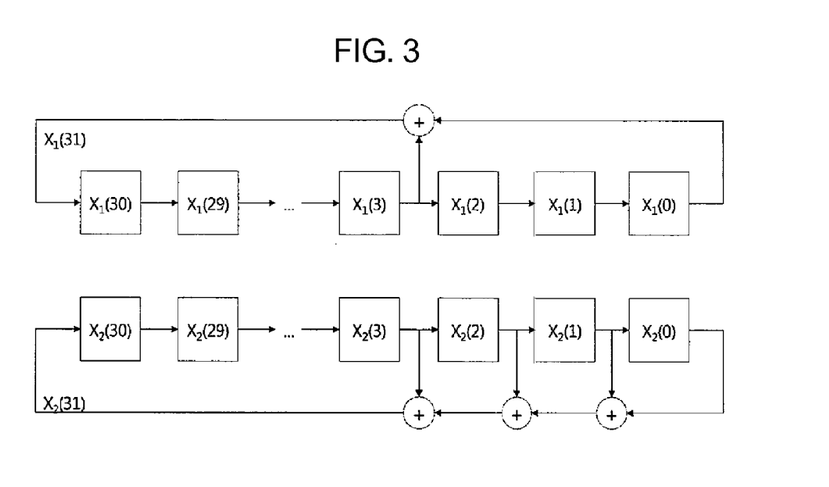
FIG. 3 is a diagram showing a 31-bit shift register.

A scrambling method proposed in LTE standards is a method of setting initial 31-bit information in a shift register having 31 bit memory elements, and outputting each bit after shifting the initially set 31-bit information via the shift register 1600 times, and the structure of the scrambling method is shown in FIG. 3. FIG. 3 illustrates a 31-bit shift register according to an embodiment of the present invention.

Referring to FIG. 3, a shift operation is in progress while two 31-bit shift registers called $X_1$ and $X_2$ independently shift their bits to the right. In this case, values of 31-bit are continuously circulated using the following Equation (1):

$$X_1(n+31) = X_1(n) \oplus X_1(n+3)$$

$$X_2(n+31) = X_2(n) \oplus X_2(n+1) \oplus X_2(n+2) \oplus X_2(n+3) \quad (1)$$

Since the shift registers have a repeatedly circulated structure, an operation is performed using only the initially set 31 bits even if the bit values of each shift register are shifted a plurality of times. When this operation is represented in another way, it means that 31 register values may be represented by the initial 31 bit values even after N shift operations corresponding to a specific value have been performed.

Figure 4:
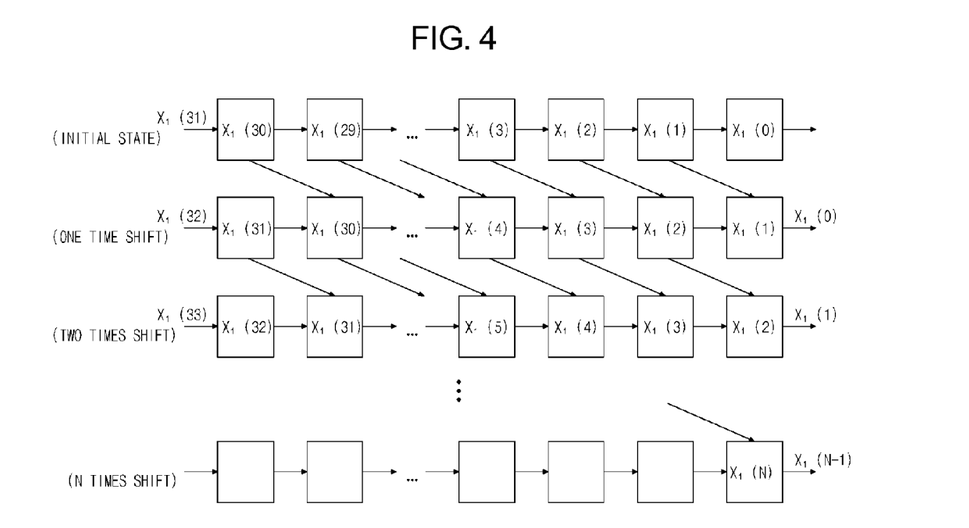
FIG. 4 is a diagram showing the progress of a shift operation and values stored in registers.

In detail, in the case of the shift register $X_1$, the initial value of a first register is $X_1(0)$, but the value of the first register, obtained after 1600 shift operations required to obtain a first output value have been performed, is represented by an equation in which initial 31 values $X_1(0) \sim X_1(30)$ are combined with each other. Meanwhile, after the shift operation has been performed N times, a value stored in the first register is $X_1(N)$, and is represented as shown in FIG. 4. FIG. 4 illustrates values stored in the registers as a shift process has progressed according to an embodiment of the present invention.

Referring to FIG. 4, actual output $c(n)$ may be obtained by the following Equation (2) since 1600 shift operations have been performed, $$c(n) = X_1(1600+n) \oplus X_2(1600+n) \quad (2)$$

Below, a method capable of directly obtaining $X_1(1600+n)$ and $X_2(1600+n)$ without performing a sequential shift operation in order to reduce time required during the process for performing the initial 1600 shift operations, proposed in the present invention, will be described. For this, values of the registers are represented by the following Equation (3):

$$X_1(N) \rightarrow x^N$$

$$X_2(N) \rightarrow y^N \quad (3)$$

When Equation (3) is applied to a cyclic relational expression, the following Equation (4) may be obtained:

$$X_1(n+31) \rightarrow x^{(n+31)} = x^n \oplus x^{n+3}$$

$$X_2(n+31) \rightarrow y^{(n+31)} = y^n \oplus y^{n+1} \oplus y^{n+2} \oplus y^{n+3} \quad (4)$$

If $X_1(1600)$ and $X_2(1600)$ are calculated by using the above Equation (4), the following Equation (5) is given:

$$x^{1600} = x^{25} \oplus x^{20} \oplus x^{19} \oplus x^{17} \oplus x^{12} \oplus x^9 \oplus x^6 \oplus x^5 \oplus x^4 \oplus x^3 \oplus x \rightarrow$$
$$X_1(1600) = X_1(25) \oplus X_1(20) \oplus X_1(19) \oplus X_1(17) \oplus X_1(12) \oplus X_1(9) \oplus X_1(6) \oplus X_1(5) \oplus X_1(4) \oplus X_1(3) \oplus X_1(1)$$

$$X_2(1600) \rightarrow y^{1600} = y^{23} \oplus y^{20} \oplus y^{19} \oplus y^{16} \oplus y^{12} \oplus y^8 \oplus y^3 \oplus y^2 \oplus y \rightarrow$$
$$X_2(1600) = X_2(23) \oplus X_2(20) \oplus X_2(19) \oplus X_2(16) \oplus X_2(12) \oplus X_2(8) \oplus X_2(3) \oplus X_2(2) \oplus X_2(1) \quad (5)$$

The results obtained by Equation (5) mean that $X_1(1600)$ and $X_2(1600)$ which are the results of performing the 1600 shift operations may be obtained using the initial 31 values without performing actual shift operations. While shift operations are performed each time since $X_1(1600)$ and $x_2(1600)$ have been directly obtained using the above Equation without performing the 1600 shift operations to obtain the initial output in this way, an actual output signal is obtained by the following Equation (6):

$$X_1(1600+n) = X_1(25+n) \oplus X_1(20+n) \oplus X_1(19+n) \oplus X_1(17+n) \oplus X_1(12+n) \oplus X_1(9+n) \oplus X_1(6+n) \oplus X_1(5+n) \oplus X_1(4+n) \oplus X_1(3+n) \oplus X_1(1+n)$$

$$X_2(1600+n) = X_2(23+n) \oplus X_2(20+n) \oplus X_2(19+n) \oplus X_2(16+n) \oplus X_2(12+n) \oplus X_2(8+n) \oplus X_2(3+n) \oplus X_2(2+n) \oplus X_2(1+n) \rightarrow c(n) = X_1(1600+n) \oplus X_2(1600+n) \quad (6)$$

Figure 5:
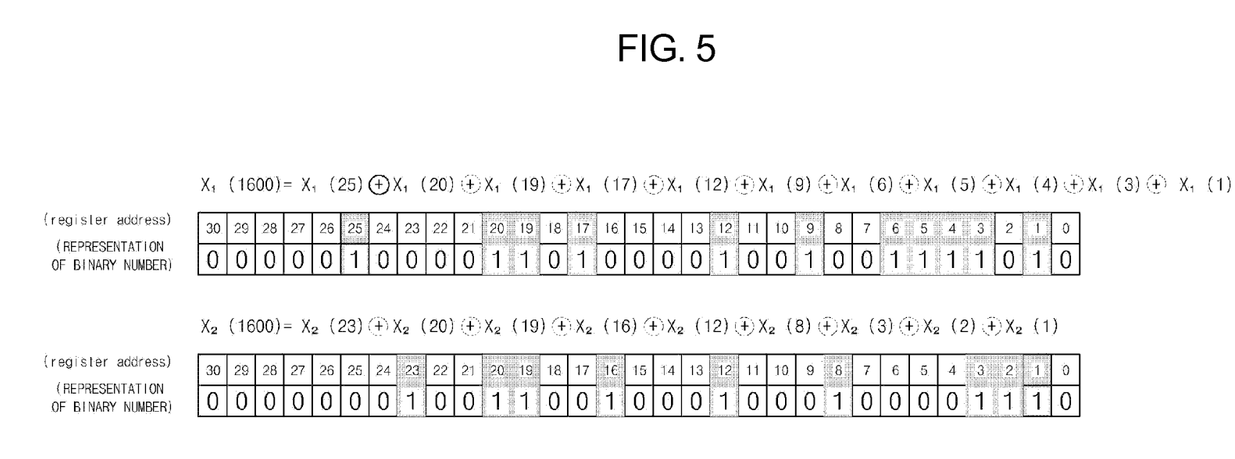
FIG. 5 is a diagram showing bit masks using binary numbers according to an embodiment of the present invention.
Figure 6:
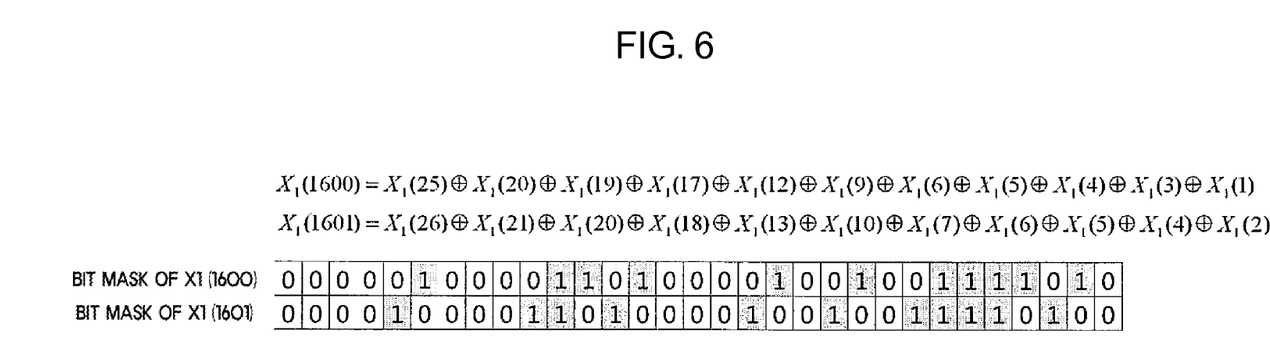
FIG. 6 is a diagram showing a process for calculating bit masks for subsequent values according to an embodiment of the present invention.

Actual equipment may efficiently implement the contents of the above Equation (6) by the representation of binary numbers. The expressions of $x_1(1600$ and $x_2(1600$ are represented by binary numbers 0 and 1, and then may indicate places at which respective values are located. FIG. 5 illustrates an example in which bit masks using binary numbers are represented according to an embodiment of the present invention. Referring to FIG. 5, the representation of binary numbers denotes values of each bit mask required to extract values actually used for exclusive-OR ($\oplus$) operations from the initial 31 register values. After the initially set 31 values have been represented by a 31-bit binary number, the exclusive-OR ($\oplus$) operation only needs to be performed on all results obtained by applying the bit mask to the 31-bit binary number. Subsequent values, that is, $x_1(1601)$ and $x_2(1601)$, may be obtained by shifting binary numbers, which are bit masks, to the right once to obtain new bit masks and by performing the $\oplus$ operation using the new bit masks. FIG. 6 illustrates a process for calculating bit masks for subsequent values according to an embodiment of the present invention.

Figure 7:
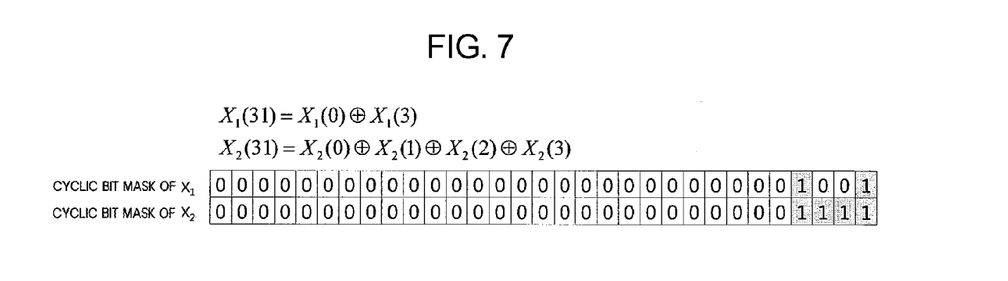
FIG. 7 is a diagram showing cyclic bit masks according to an embodiment of the present invention.

By means of the above method, bit masks are shifted, and values of the shift registers $X_1$ and $X_2$ are sequentially obtained. Here, it should be noted that if the bit masks of $X_1$ and $X_2$ are placed at register address 31 having a bit value of '1' while the bit masks of $X_1$ and $X_2$ are being shifted, the corresponding address 31 indicates a circulating location, and thus cyclic bit masks to which cyclic equations are applied must be used. FIG. 7 illustrates cyclic bit masks according to an embodiment of the present invention.

Figure 8:
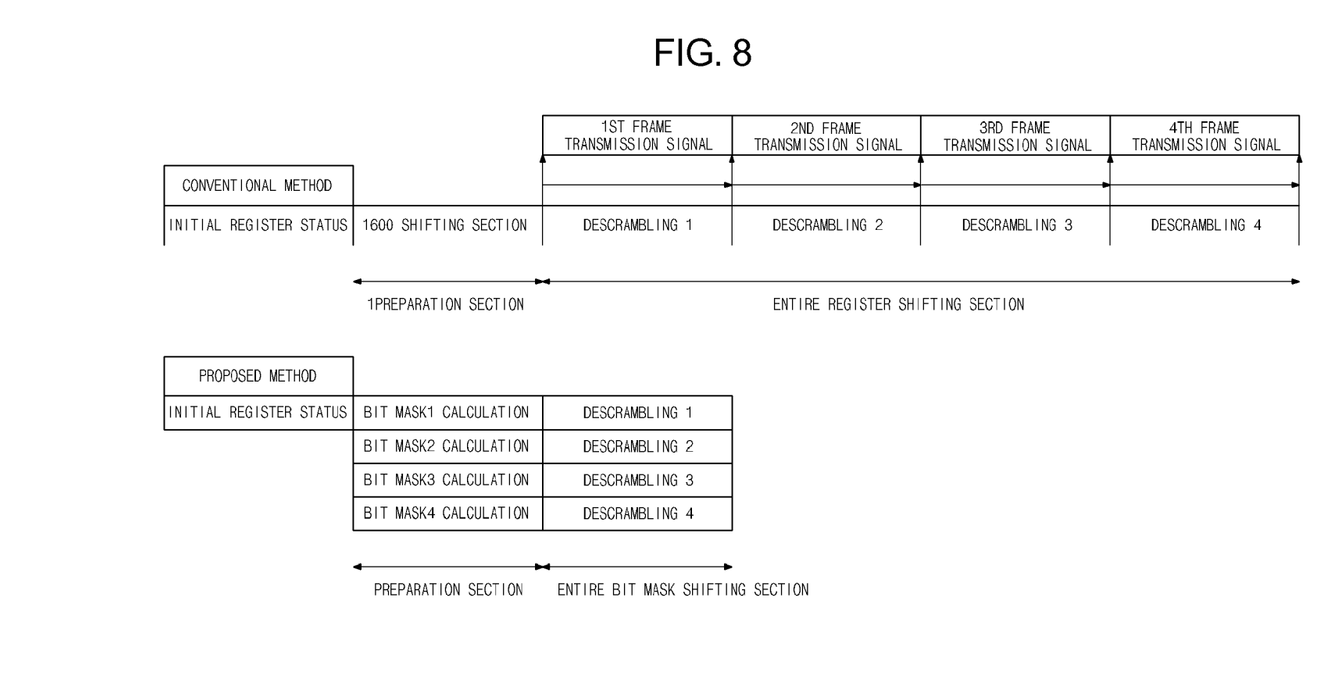
FIG. 8 is a diagram showing a PBCH blind descrambling method according to an embodiment of the present invention.

If the above contents are applied to a blind descrambling process for finding frames in which the PBCH is transmitted, the configuration of FIG. 8 may be obtained.

FIG. 8 illustrates the contents of PBCH blind descrambling according to the present invention, compared to a conventional method.

When descrambling is performed in a blind descrambling manner to find transmission frame numbers in a state in which transmitted frame numbers are not recognized, the conventional method sequentially performs shift registering so as to perform descrambling corresponding to first, second, third, and fourth transmission frames, whereas the method proposed in the present invention sets values of initial bit masks corresponding to the respective transmission frames and thereafter simultaneously performs descrambling corresponding to the four transmission frames in parallel. Therefore, when descrambling times are compared with each other, the method proposed in the present invention requires time corresponding to ¼ of that of the conventional method.

Until now, the method for rapidly processing descrambling for finding transmission frame numbers in a blind descrambling manner has been described. Below, a method for promptly performing a CRC check for finding the number of transmit antennas in a blind manner will be described.

Information about the number of transmit antennas of a downlink is transmitted after 16-bit information about the number of antennas defined in LTE standards has been encoded by masking 16-bit CRC information on an MIB message that is higher information. 16-bit information for each transmit antenna defined in LTE standards is given by the following Table 1.

TABLE 1

| Number of transmit antenna ports at eNodeB | PBCH CRC mask |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

Therefore, in a receiving stage, all pieces of 16-bit transmit antenna information are eliminated from the lower 16-bit information of a decoded signal using bit masking so as to detect the number of transmit antennas, and thereafter a CRC check is performed on the 16-bit transmit antenna information. In this process, if, in the CRC check, it is determined that an error is not present, the number of transmit antennas is detected by finding the 16-bit transmit antenna information.

In order to decode the PBCH based on the above description and thereafter find hidden 16-bit information about the number of transmit antennas, a total of three <CRC de-masking & CRC check> processes must be performed. In order to reduce a computational load during these processes, the present invention proposes the following method.

Generally, a CRC check is a process for determining whether an error is present in a decoded signal. In LTE standards, a message obtained by decoding a PBCH is divided by a 16-degree polynomial defined in the standards. If the remainder of the division is '0,' it is determined that an error is not present, whereas if the remainder is not '0,' it is determined that an error is present. If it is assumed that the representation of a decoded message by a polynomial when an error is not present is 'M' and the 16-degree CRC polynomial is 'P,' and that the representation of 16-bit transmit antenna information by a polynomial is 'T,' the following Equation (7) is established:

decoded message: $b(N), b(N-1), K, b(1), b(0) \rightarrow M = b(N)X^N + b(N-1)X^{N-1} + \Lambda + b(1)X + b(0)$ 16-bit transmit antenna information: $r(15), r(14), K, r(1), r(0) \rightarrow T = r(15)X^{15} + r(14)X^{14} + \Lambda + r(1)X + r(0)$ 16-degree CRC polynomial $\rightarrow P = X^{16} + X^{12} + \Lambda + X^5 + 1$ $$(M-T) \bmod P = 0 \quad (7)$$

This equation means that a remainder obtained by dividing M−T by the 16-degree CRC polynomial P becomes '0' only when the 16-bit transmit antenna information T is removed from the decoded message M. Accordingly, if the decoded message M is directly divided without eliminating the 16-bit transmit antenna information T, the following Equation (8) is established.

$$M \bmod P = (M-T+T) \bmod P = (M-T) \bmod P + T \bmod P = T \bmod P \quad (8)$$

Since T is a 15-degree polynomial and P is a 16-degree polynomial, T mod P=T is established. That is, when M is divided by P, the remainder is T. In other words, when a CRC check is directly performed without removing the 16-bit transmit antenna information from the decoded message, the remainder is 16-bit transmit antenna information. When this contents are used, if a remainder, obtained by immediately performing a CRC check without removing the 16-bit CRC mask after decoding, is a single value described in Table 1, the value is recognized as the number of transmit antennas, whereas if the remainder is not a value described in Table 1, an error is determined to have occurred.

That is, in the conventional method, the CRC check is performed a total of three times in consideration of the total number of antennas, whereas the method proposed in the present invention may detect information about the number of antennas by performing a CRC check only once.

Figure 9:
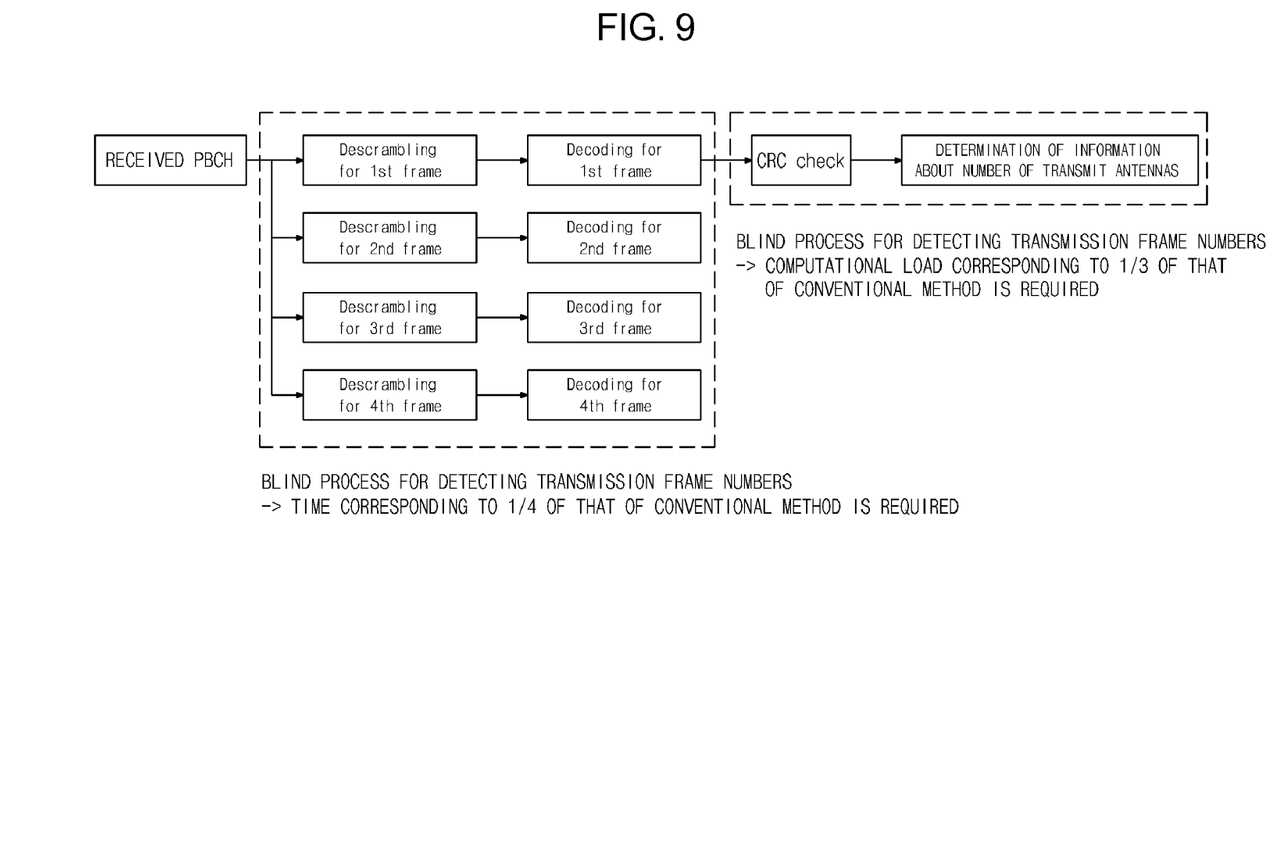
FIG. 9 is a diagram showing the effects of the method proposed in the present invention compared to a conventional method.

Until now, processes for finding 1) transmission frame numbers and 2) information about the number of transmit antennas, which are contained in the received PBCH, in a blind manner have been described. That is, as shown in FIG. 9, it can be seen that, compared to the conventional method, the method proposed in the present invention may more promptly find the corresponding information.

As described above, the PBCH blind decoding method in the LTE system according to the present invention may promptly find transmission frame numbers and transmit antenna information, compared to a conventional method. That is, there is an advantage in that, by using the method proposed in the present invention, transmission frame numbers and transmit antenna information may be efficiently found with a low computational load.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of extracting frame numbers, the method extracting frame numbers of a Physical Broadcast Channel (PBCH) transmitted by a base station so as to obtain a Master Information Block (MIB) in a Long Term Evolution (LTE) system, comprising:
    calculating values obtained by shifting bit values constituting a 31-bit shift register to right 1600 times;
    performing an exclusive-OR operation on bit values of initially set specific bits among the values of the shift register shifted 1600 times; and
    descrambling results of performing the exclusive-OR operation,
    wherein the values obtained by shifting bit values constituting a 31-bit shift register to right 1600 times are calculated using an equation:

$X_1(1600+n) = X_1(25+n) \oplus X_1(20+n) \oplus X_1(19+n) \oplus X_1(17+n) \oplus X_1(12+n) \oplus X_1(9+n) \oplus X_1(6+n) \oplus X_1(5+n) \oplus X_1(4+n) \oplus X_1(3+n) \oplus X_1(1+n)$, wherein n is 0 or positive integer of not more than 30,
    wherein $X_1(n)$ represents bit values of the N-th shift register,
    wherein N is a positive integer,
    wherein $X_1(31)$ equals to $X_1(3) + X_1(0)$,
    wherein $X_1(1600+n)$ represents bit values obtained by shifting bit values constituting a 31-bit shift register to right 1600 times.

2. The method of claim 1, further comprising:
    performing the exclusive-OR operation; and
    performing exclusive-OR operations in parallel for four types in which the bit values of the initially set specific bits are different from one another.

3. The method of claim 2, further comprising respectively performing descrambling on results of the exclusive-OR operations performed in parallel.

4. The method of claim 3, wherein frame numbers are obtained using the results of the descrambling.

* * * * *